US012168954B1

(12) United States Patent
Buchanan et al.

(10) Patent No.: US 12,168,954 B1
(45) Date of Patent: Dec. 17, 2024

(54) ROTARY COMBUSTION ENGINE

(71) Applicants: William Gregory Buchanan, King George, VA (US); Vincent J. Vendetti, King George, VA (US)

(72) Inventors: William Gregory Buchanan, King George, VA (US); Vincent J. Vendetti, King George, VA (US)

(73) Assignee: USA as rep by the Secretary of the Navy, Arlington, VA (US)

( * ) Notice: Subject to any disclaimer, the term of this patent is extended or adjusted under 35 U.S.C. 154(b) by 0 days.

(21) Appl. No.: 16/831,023

(22) Filed: Mar. 26, 2020

Related U.S. Application Data

(63) Continuation-in-part of application No. 16/668,530, filed on Oct. 30, 2019, now Pat. No. 11,143,098.

(60) Provisional application No. 62/913,364, filed on Oct. 10, 2019, provisional application No. 62/853,223, filed on May 28, 2019, provisional application No. 62/828,595, filed on Apr. 3, 2019.

(51) Int. Cl.

| | |
|---|---|
| ***F02B 53/12*** | (2006.01) |
| ***F01C 1/22*** | (2006.01) |
| ***F01L 1/18*** | (2006.01) |
| ***F02B 53/00*** | (2006.01) |
| ***F02B 53/04*** | (2006.01) |

(Continued)

(52) U.S. Cl.
CPC ................ *F02B 53/12* (2013.01); *F01C 1/22* (2013.01); *F01L 1/18* (2013.01); *F02B 53/00* (2013.01); *F02B 53/04* (2013.01); *F02B 53/06* (2013.01); *F02B 55/00* (2013.01); *F02B 55/02* (2013.01); *F02B 55/08* (2013.01); *F02B 55/14* (2013.01)

(58) Field of Classification Search
CPC .......... F02B 53/00; F02B 53/04; F02B 53/06; F02B 53/12; F02B 55/00; F02B 55/02; F02B 55/08; F02B 55/14; F01C 1/22; F01L 1/18
See application file for complete search history.

(56) References Cited

U.S. PATENT DOCUMENTS 926,641 A * 6/1909 Coffey .................... F02B 53/00 123/246
1,028,316 A 6/1912 Allyn
(Continued)

*Primary Examiner* — Audrey B. Walter
(74) *Attorney, Agent, or Firm* — Edward M. Bushard; Gerhard W. Thielman

(57) ABSTRACT

A rotary engine is provided to produce torque. The engine includes a planar housing, an elongated rotor, a pair of double-concave blades, fore and aft cover plates, and a gear box. The housing has a circular center cavity, and a pair of circular lateral cavities overlapping the center cavity and disposed along a longitudinal axis. The rotor is disposed on a rotor shaft along a rotation axis perpendicular to the longitudinal axis within the center cavity. The blades flank the rotor and are disposed within their corresponding lateral cavity and turn on corresponding blade shafts parallel to the rotor shaft. The blades flank the rotor disposed within their corresponding lateral cavity and turn on corresponding blade shafts parallel to the rotor shaft. The fore and aft cover plates flank the housing along the rotation axis to cover the center and lateral cavities. The gear box is disposed on the aft cover plate and has a rotor gear wheel with adjacent corresponding blade gear wheels. The rotor gear wheel turns with the rotor shaft while engaging both blade gear wheels along their peripheries. The blade gear wheels turn with the corresponding blade shafts. The blades turn opposite to the rotor.

3 Claims, 15 Drawing Sheets

(51) Int. Cl.

| | |
|---|---|
| ***F02B 53/06*** | (2006.01) |
| ***F02B 55/00*** | (2006.01) |
| ***F02B 55/02*** | (2006.01) |
| ***F02B 55/08*** | (2006.01) |
| ***F02B 55/14*** | (2006.01) |

(56) References Cited

U.S. PATENT DOCUMENTS

| | | | | | |
|---|---|---|---|---|---|
| 1,052,045 | A | * | 2/1913 | Doedyns | F04C 2/14<br>418/196 |
| 1,701,534 | A | | 2/1929 | Knopp | |
| 2,920,610 | A | * | 1/1960 | Breelle | F01C 1/20<br>123/246 |
| 2,988,008 | A | | 6/1961 | Wankel | 303/121 |
| 3,297,006 | A | * | 1/1967 | Marshall | F02B 53/00<br>418/94 |
| 3,435,808 | A | * | 4/1969 | Allender | F02B 53/00<br>123/232 |
| 4,057,035 | A | * | 11/1977 | Su | F02B 53/04<br>123/232 |
| 5,305,721 | A | | 4/1994 | Burtis | 123/205 |
| 6,129,067 | A | * | 10/2000 | Riley | F01C 1/20<br>123/246 |
| 8,936,004 | B1 | | 1/2015 | Buchanan | 123/228 |
| 2009/0229787 | A1 | * | 9/2009 | Lurtz | F01C 11/002<br>165/45 |

* cited by examiner

60°

75°

1100

90°

105°

120°

135°

150°

165°

ROTARY COMBUSTION ENGINE

CROSS REFERENCE TO RELATED APPLICATION

Pursuant to 35 U.S.C. § 119, the benefit of priority from provisional applications 62/828,595, 62/853,223 and 62/913,364, with respective filing dates of Apr. 3, 2019, May 28, 2019 and Oct. 10, 2019, is claimed for this non-provisional application. The invention is a Continuation-in-Part, claims priority to and incorporates by reference in its entirety U.S. patent application Ser. No. 16/688,530 filed Oct. 30, 2019 and assigned Navy Case 105803.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to rotary engines. In particular, the invention relates to rotary engines with simple geometries.

Rotary internal combustion engines have been developed for decades. These include U.S. Pat. No. 1,028,316 to Allyn, U.S. Pat. No. 1,701,534 to Knopp, U.S. Pat. No. 2,988,008 to Wankel (the best known), and U.S. Pat. No. 5,305,721 to Burris. Another more recent is U.S. Pat. No. 8,936,004 to Buchanan with a modified Otto cycle (under tradename "EPIC") as Navy Case 100714.

SUMMARY

Conventional rotary engines yield disadvantages addressed by various exemplary embodiments of the present invention. In particular, various exemplary embodiments provide a rotary engine to produce torque (via the EPIC cycle). The engine includes a planar housing, an elongated rotor, a pair of double-concave blades, fore and aft cover plates, and a gear box. The housing has a circular center cavity, and a pair of circular lateral cavities overlapping the center cavity and disposed along a longitudinal axis. The rotor is disposed on a rotor shaft along a rotation axis perpendicular to the longitudinal axis within the center cavity.

The blades flank the rotor and are disposed within their corresponding lateral cavity and turn on corresponding blade shafts parallel to the rotor shaft. The fore and aft cover plates flank the housing along the rotation axis to cover the center and lateral cavities. The gear box is disposed on the aft cover plate and has a rotor gear wheel with adjacent corresponding blade gear wheels. The rotor gear wheel turns with the rotor shaft while engaging both blade gear wheels along their peripheries. The blade gear wheels turn with the corresponding blade shafts. The blades turn opposite to the rotor.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs quantity units with the following abbreviations: length in inches (in), mass in pounds-mass (lbm), time in seconds (s) and angles in degrees (°).

Exemplary embodiments describe a family of rotary engines that employ an Exhaust Power Intake Compression (EPIC) stroke cycle via a valve-operation configuration. This EPIC cycle supports the rapid movement of compressed fuel-air mixture from the front of a piston-like lobe feature to the rear of piston-like lobe feature such that the movement of a rotor is continuous and circular about the crank shaft (rather than reciprocating or otherwise moving in an oscillatory direction).

An exemplary EPIC engine, partially defined as an engine that multiplies power density with the addition of pistons using the EPIC cycle, the benefits of the geometry described below are smaller size and lighter weight than any conventional reciprocating piston engine or other attempts at rotary combustion. Thus, an exemplary two-cylinder rotary wall valve (RWV) EPIC engine performs as a four-cylinder engine.

Figure 1:
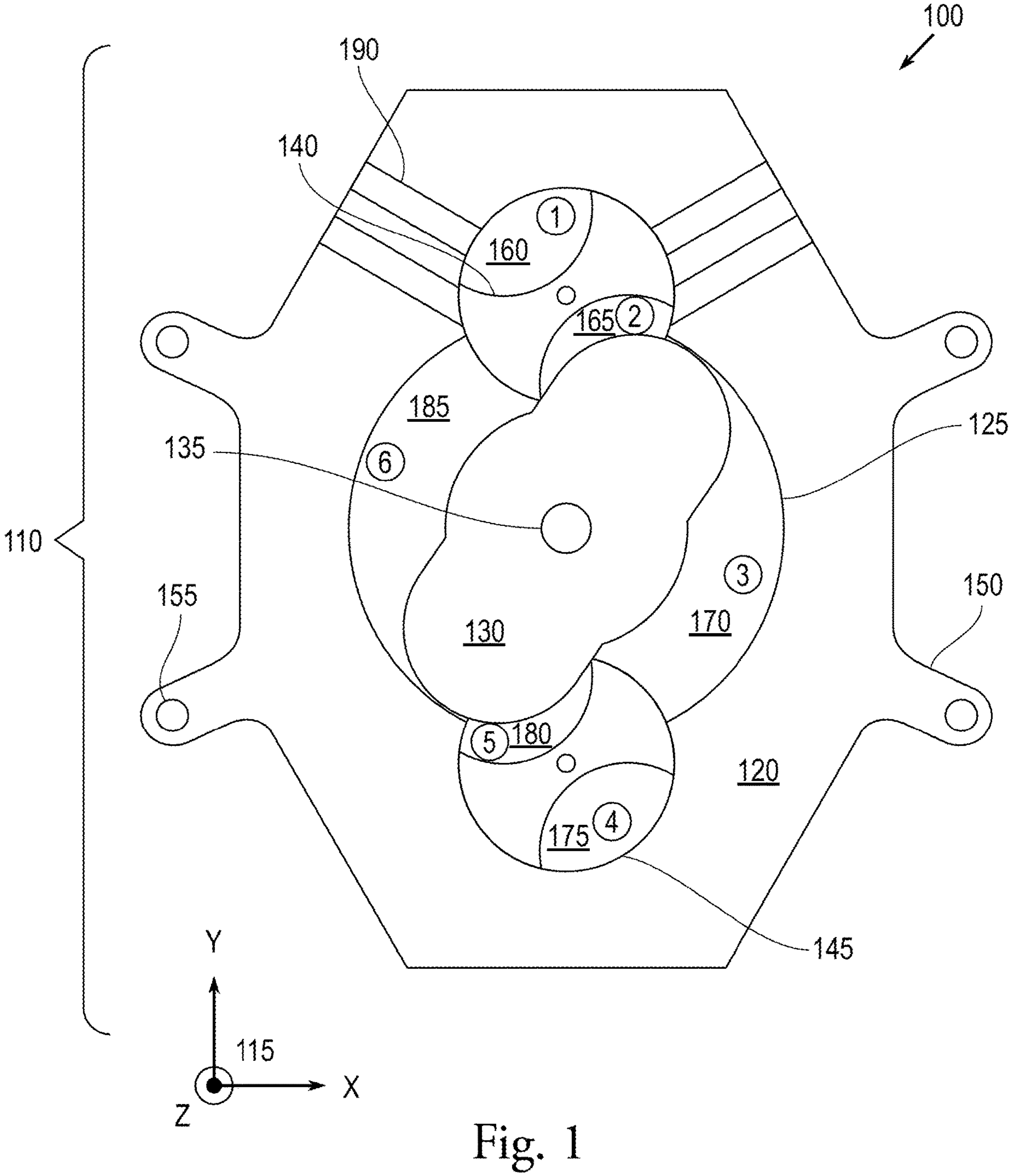
FIG. 1 is an elevation view of an exemplary bilateral rotary engine.

FIG. 1 shows an elevation view 100 of an exemplary rotary engine 110 having bilateral symmetry. A compass rose 115 features horizontal X and vertical Y directions for orientation. An elongated hexagonal housing 120 encloses the rotating components and includes a central cylindrical cavity 125. An ellipsoid rotor 130 with revolution axis 135 along the Z direction is centrally disposed in the housing 120 to rotate within the cavity 125. A pair of double concave blades 140 flank the rotor 130 from above and below in relation to the Y direction within extension cavities 145 that overlap the central cavity 125. Each blade 140 denotes the turning isolation member of its rotary wall valve. The bilateral symmetry separates the valves around the rotor 130 by 180°.

Example prototypes have been built and tested with longitudinal length of about 14 in and mass of the housing 120 of 35 lbm, composed of appropriate metals (e.g., steel), ceramics or composites that can tolerate tensile, thermal and pressure loads. However, the exemplary engine 110 is highly scalable to much larger and smaller sizes, depending on purpose.

The housing 120 includes wing protrusions 150 with through-holes 155 for mounting to a platform. The cavities 125 and 145 provide for chambers. The blade 140 for the upper valve forms first and second chambers 160 and 165. A third chamber 170 forms between the rotor 130 and the right wall of the cavity 125. The blade 140 for the lower valve forms fourth and fifth chambers 175 and 180. The sixth chamber 185 forms between the rotor 130 and the left wall of the cavity 125. The circular shapes for the cavities 125 and 145, as well as the periphery of the blades 140 facilitate rotary motion in the engine, as well as aid in fabrication, quality inspection and maintenance.

Figure 2:
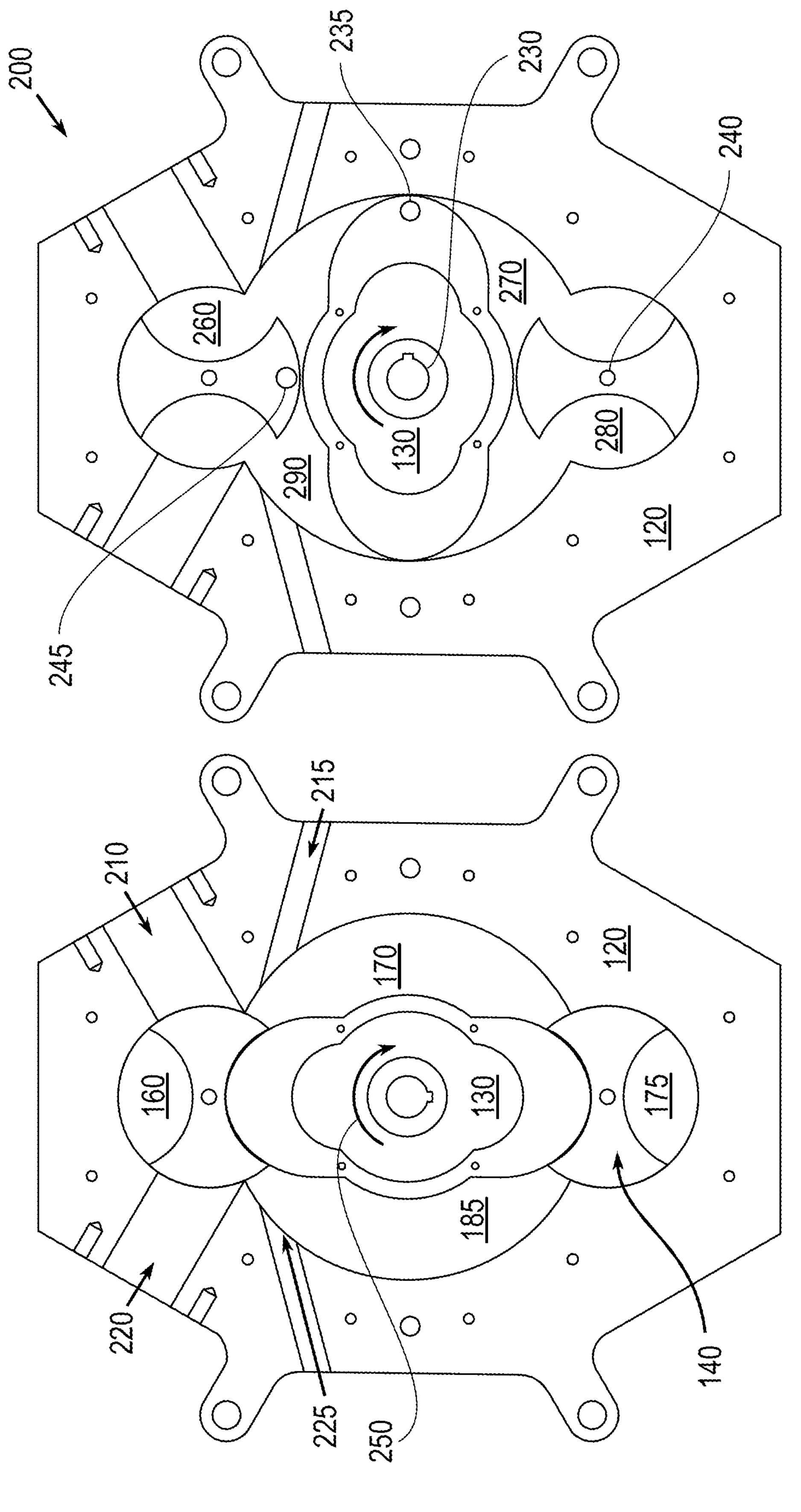
FIG. 2 is an elevation view of the engine.

FIG. 2 shows an elevation view 200 of the engine 110 at 0° and 90° positions. On the right side, the housing 130 includes an intake valve port channel 210 extending into the upper cavity 145 and an intake rotor port channel 215 entering into the central cavity 125. On the left side, the housing 130 includes an exhaust valve channel 220 and an exhaust rotor channel 225 exiting from their respective cavities 145 and 125. In alternate embodiments, the rotor channels 215 and 225 are optional and may be omitted. The rotor 130 spins on a rotor shaft 230 and optionally includes a mark 235 for purposes of explanation in orientation. The blades 140 spin on blade shafts 240 and optionally include corresponding marks 245 for orientation. The rotor shaft 230 turns clockwise direction 250, causing the blade shafts 240 to turn anti-clockwise. The valve intake 210 and exhaust 220 receive or release air, whether ambient mixed with fuel or exhaust.

In the 0° position, the marks 235 and 245 are respectively at the bottom and towards the right. This orientation disposes the first chamber 160 above the upper blade 140, the third chamber 170 right of the rotor 130, the fourth chamber 175 below the lower blade 140, and the sixth chamber 185 left of the rotor 130. In this position, the first chamber 160 is defined by the upper blade 140 in upper cavity 145, while the second chamber 165 is disposed between the upper blade 140 and the rotor 130. Similarly, the fourth chamber 175 is defined by the lower blade 140 in lower cavity 145, while the fifth chamber 180 is disposed between the lower blade 140 and the rotor 130. Also, the third and sixth chambers 170 and 185 are defined by the rotor 130 in cavity 125.

In the 90° position, the marks 235 and 245 are reversed for their respective rotor 130 and blade 140. Moreover, the second chamber 165 defined by the valve 140 in cavity 145 merges with the lower portion of the third chamber 170 defined by the rotor 130 in cavity 125 to form a first stroke region 260 denoted as intake. Concurrently, the fourth chamber 175 merges with the lower portion of the sixth chamber 185 to form a second stroke region 270 denoted as compression. Further, the fifth chamber 180 merges with the upper portion of the sixth chamber 185 to form a third stroke region 280 denoted as power. Finally, the second chamber 165 merges with the upper portion of the third chamber 170 to form the fourth stroke region 290 denoted as exhaust.

Fuel can be injected in the third chamber 170 during the first stroke 260. A spark to initiate combustion can be applied during the third stroke 280. A spark to initiate combustion could be applied during the third stroke 280. It is important to note that each revolution of a two-piston-lobe rotor contains two power strokes (equivalent to a four-cylinder conventional reciprocating piston-engine). One should note that the blades 140 act as wall valves that not only direct intake and exhaust flow of air during the EPIC Cycle, but in the lower cavity 145 also act to instantaneously transfer the compressed fuel-air mixture in front of the piston-like lobe, to the rear of the piston-like lobe at, or just prior to the moment of spark or compression ignition. In this manner, the same lobe that compressed the mixture on its front face receives the combustion power-stroke on its rear face while moving continuously in the same direction.

Figure 3:
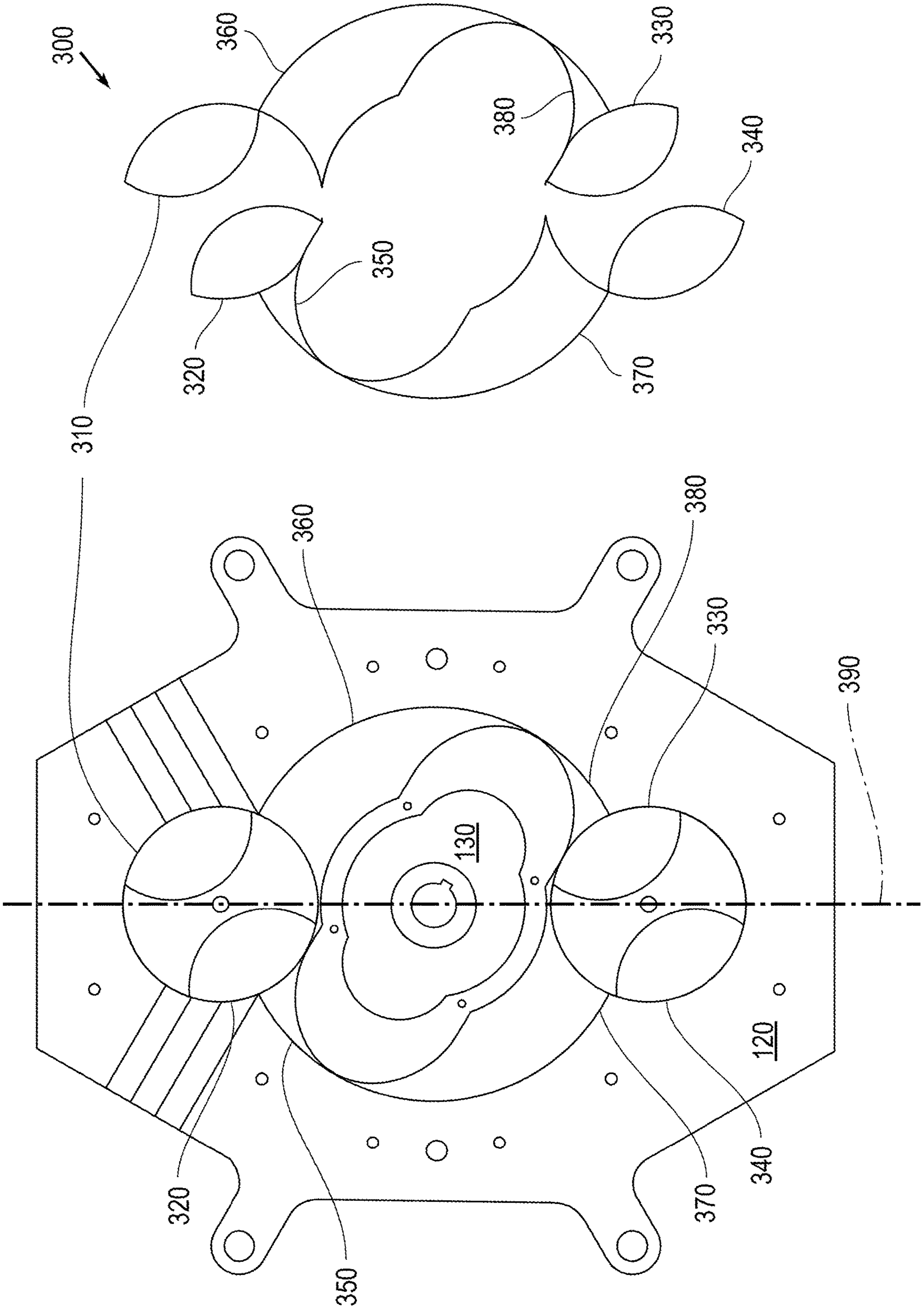
FIG. 3 is an elevation view of the engine.

FIG. 3 shows an elevation view 300 of the engine 110 with split and amalgamated chambers as the rotor 130 and blades 140 turn. The valve zone segments are identified as positions top right 310, top left 320, bottom right 330, bottom left 340. The rotor zone segments are identified as positions upper left 350, upper right 360, lower left 370 and lower right 380. Upper positions 320 and 350 combine to form an upper left zone corresponding to exhaust 290. Lower positions 330 and 380 combine to form a lower right zone corresponding to compression 270. A bilateral symmetry axis 390 parallel to the Y direction forms a longitudinal line along which the shafts 230 and 240 align. Their respective spin axes 135 and 145 are perpendicular to the longitudinal axis 390.

In the 120° position, top right segment 310 corresponds to the second chamber 165, top left segment 320 corresponds to the first chamber 160, bottom right segment 330 corresponds to the fourth chamber 175, and bottom left segment 340 corresponds to fifth chamber 180. Upper segments 350 and 360 correspond to the sixth chamber 185. Lower segments 370 and 380 correspond to the third chamber 170.

In the 300° position, the segments repeat in geometry due to symmetry, but in alternate order. top right segment 310 corresponds to the first chamber 160, top left segment 320 corresponds to the second chamber 165, bottom right segment 330 corresponds to the fifth chamber 180, and bottom left segment 340 corresponds to fourth chamber 175. Upper segments 350 and 360 correspond to the third chamber 170. Lower segments 370 and 380 correspond to the sixth chamber 185. This constitutes a reversal of the 120° position. The entire EPIC cycle repeats upon reaching the 360° position.

Figure 4:
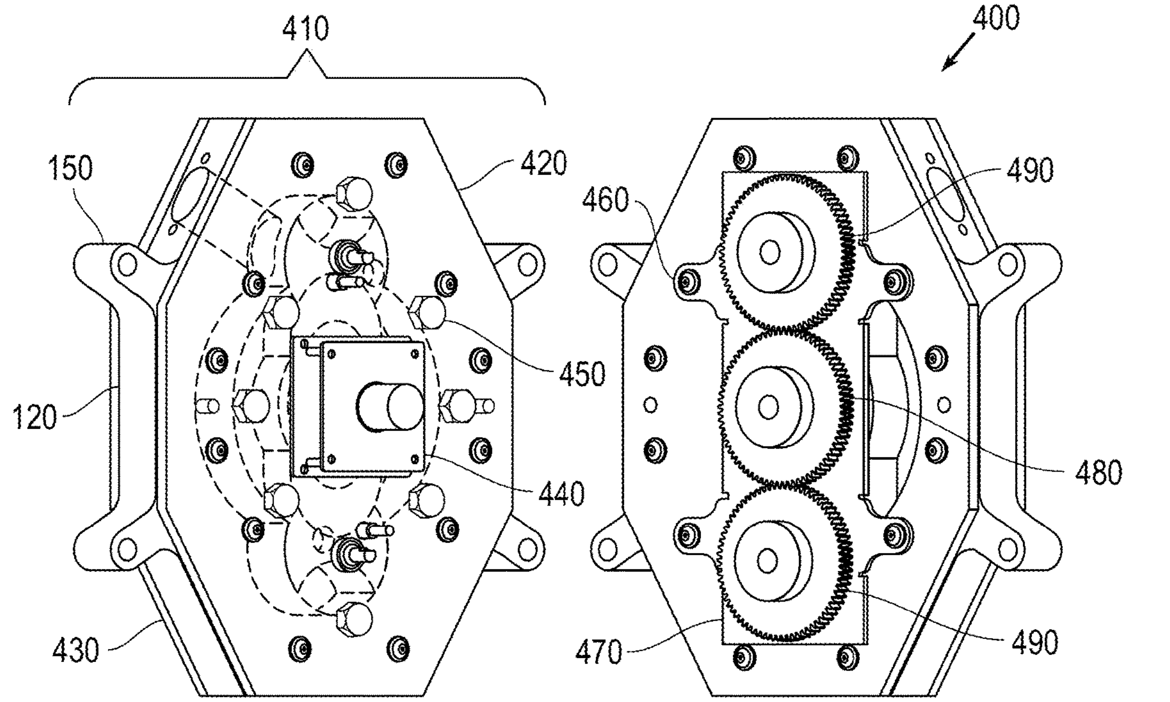
FIG. 4 is an isometric view of an engine assembly.

FIG. 4 shows an isometric assembly view 400 of the engine 110 enclosed by cover plates as an assembly 410. On the left, a front faceplate 420 is shown facing the viewplane, and on the right, a rear faceplate 430 is similarly featured. The front faceplate 420 includes a driver interface 440 with which apply torque from the engine 110. Threaded plugs 450 cover instrumentation ports. The faceplates 420 and 430 sandwich the engine 110 secured to each other by threaded bolts 460. A gear box 470 attaches to the rear faceplate 430 and includes a stroke gear 480 that engage upper and lower valve gears 490, which thereby turn opposite the stroke gear 480. Using gear wheels, the rotor 130 and blades 140 can turn concurrently in opposite directions without frictional interference along their adjacent surfaces.

Figure 5:
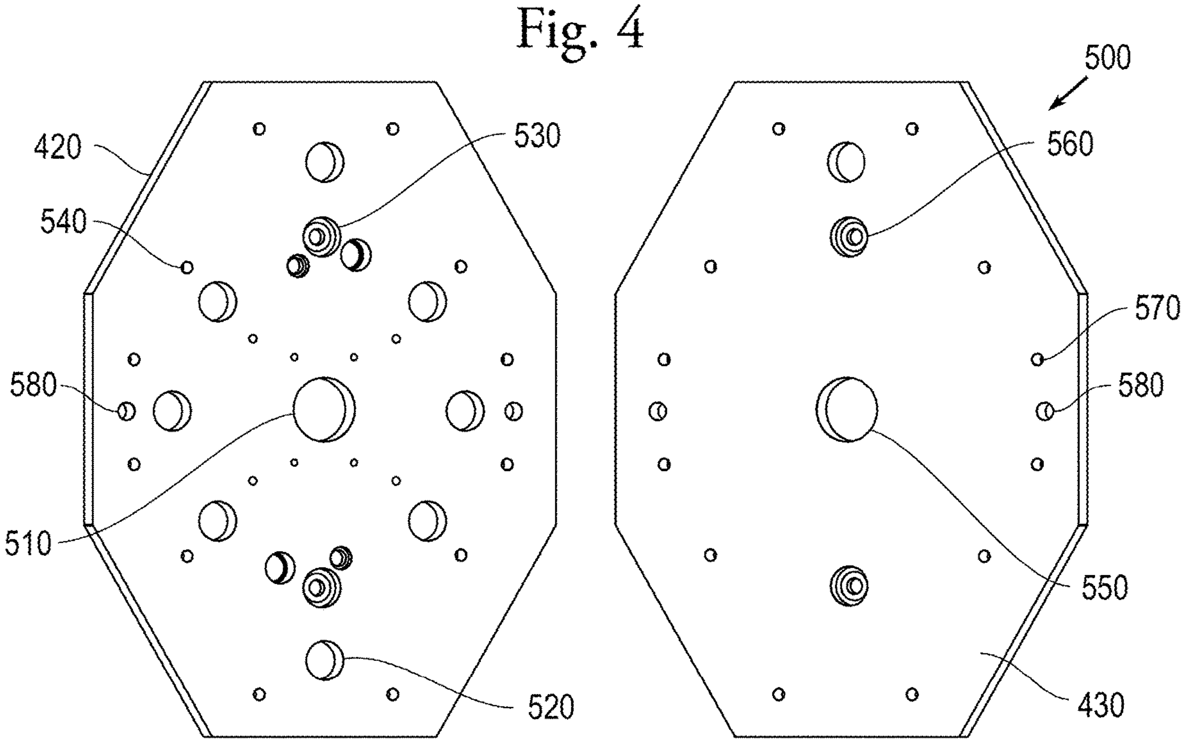
FIG. 5 is an isometric view of fore and aft cover plates.

FIG. 5 shows an isometric view 500 of front and rear faceplates 420 and 430. The front faceplate 420 includes a center hole 510, distributed holes 520, upper and lower stepped holes 530 that flank the center hole 510, and mounting holes 540 along the periphery. The center hole 510 receives the rotor shaft 230. The plugs 450 insert into perimeter holes 520. The stepped holes 530 flanking the center hole 510 receive the blade shafts 240. The rear faceplate 430 includes a center hole 550, upper and lower stepped holes 560 and mounting holes 570. Both faceplates 420 and 430 include horizontal alignment holes 580 that flank the center hole 510 to align with the housing 120 during assembly installation.

Figure 6A:
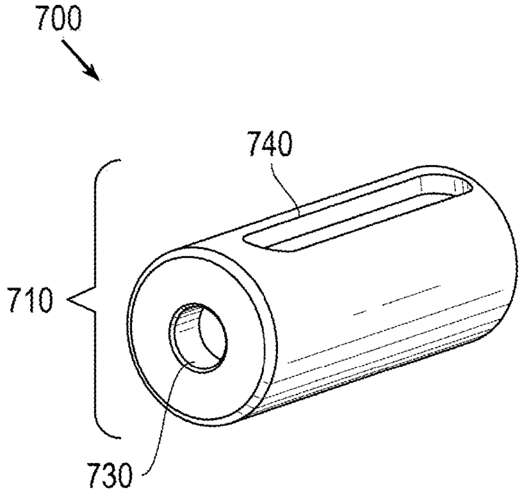
FIGS. 6A and 6B are respective isometric and elevation views of a blade.
Figure 6A:
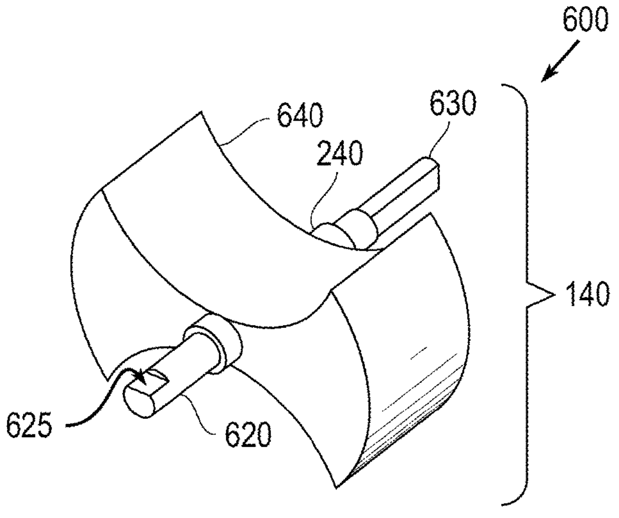
Figure 6B:
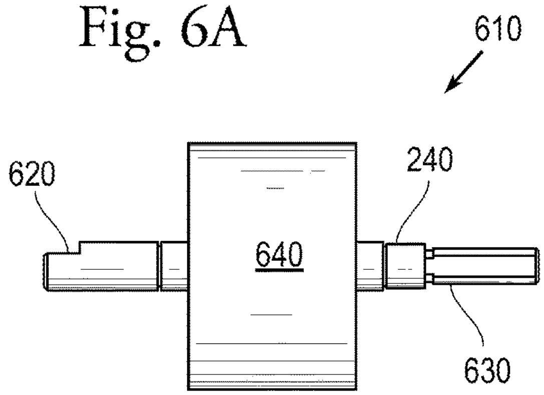

FIG. 6A shows an isometric view 600 of a blade 140 that serves as a valve despite its double concave apple-core profile. FIG. 6B shows an elevation view 610 of the blade 140. The blade shaft 240 includes a fore extension 620 with a notch 625, and an aft extension 630 with chamfered profile. The blade shaft 240 can connect to its corresponding components by any effective and appropriate mechanism. A double concave member 640 conforms to the cavity 145 interior with circular arcs for both outer perimeter and inner scoop. The fore extension 620 passes through the stepped holes 530 of the front faceplate 420. The aft extension 630 passes through the stepped holes 560 of the rear faceplate 430. The cross-section profile of the blade 140 mates properly with the rotor 130 and housing 120 throughout its rotation, while providing for combustion and sealing. This includes providing adequate strength to handle the variable pressures and temperatures of the EPIC cycle.

Figure 7:
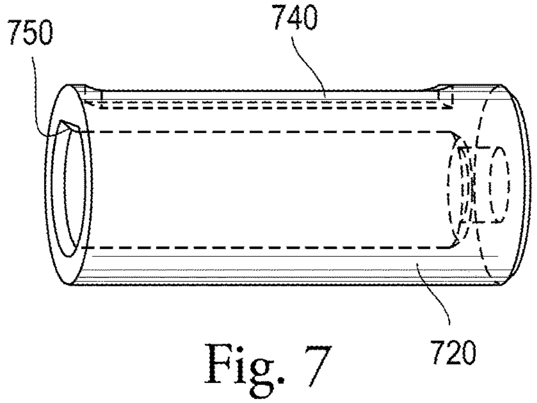
FIG. 7 is an isometric view of a cylinder.

FIG. 7 shows an isometric view 700 of an aft annular gear sleeve 710 that attaches to the aft extension 630. The sleeve 710 includes an outer case with an inner bore 730. A longitudinal slot 740 extends along the periphery of the case 720. At its distal end, the bore 730 includes a flat chamfer 750 for proper orientation upon insertion to the extension 630. Once attached to the rotary wall valve, the sleeve 710 provides an interface by which the associated gear 490 attaches. Other attachment mechanisms that provide better timing adjustment such as a Morse taper or splines can be conceived.

The rotor 130 incorporates a shape that enables a desired compression ratio to be designed with good sealing, thereby eliminating waste from over- and under-compression for improved engine operations. The rotor 130 transfers compressed gasses from the front of the piston to the rear to support combustion and enables the EPIC cycle while representing at least two pistons by simultaneously engaging two or more blades 140 for their respective valves. The rotor 130 minimizes any opening, properly capturing compressed gasses for use in energy production and preserving the desired compression ratio.

The rotor 130 can be tailored to operate with existing or new designs for housing 120 and blade 140 with bilateral or concentric peripheral geometries. The rotor 130 conforms to the housing cavity 125, permitting the remainder of the rotor's shape to be contoured as needed to support engine functions. The rotor 130 can extend thickness to increase internal volume of the cavity 125. The housing 120 with its cavity 125 can be sized and shaped to match the rotor 130. The exemplary engine 110 can be scaled as needed.

Figure 8:
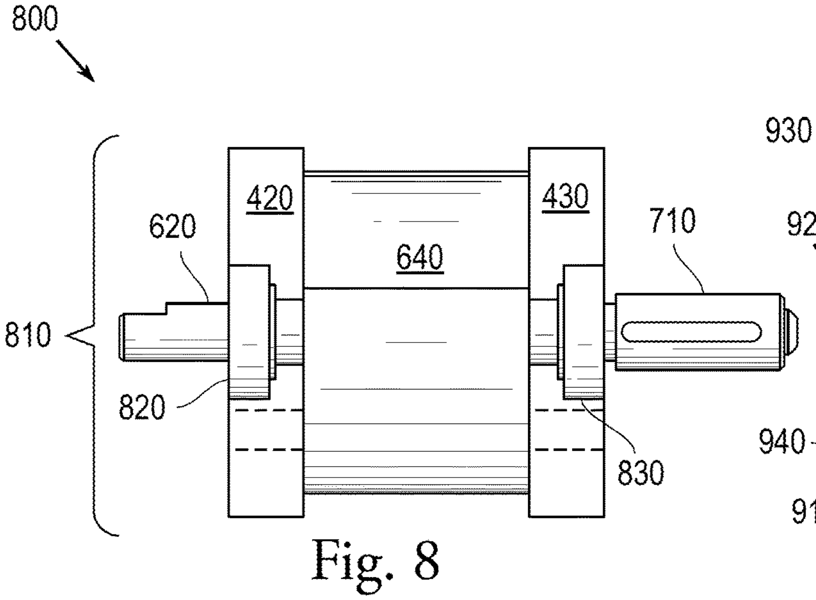
FIG. 8 is an elevation assembly view of a valve with the blade.
Figure 9:
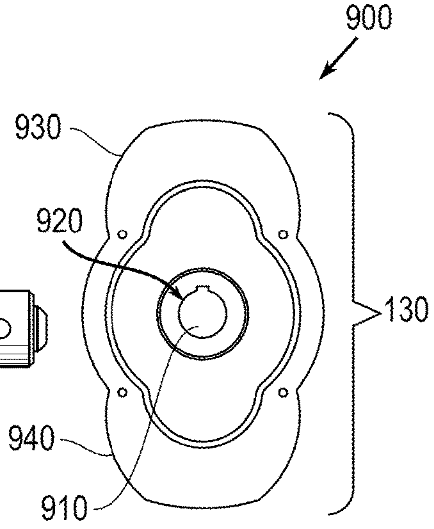
FIG. 9 is an elevation view of the rotor.

FIG. 8 shows an elevation view 800 of valve assembly 810. From the front, the fore extension 620 inserts into the front faceplate 420 supported by a front ring bearing 820. The sleeve 710 attaches to the aft extension 630, which inserts into the rear faceplate 430 supported by a rear ring bearing 830. The blade member 640 straddles the shaft 230 between the extensions 620 and 630. FIG. 9 shows an elevation view 900 of the rotor 130. A shaft hole 910 with a notch 920 receives the shaft 230. The elongated body includes upper and lower wings 930 and 940 that engage the valve members 640. The planar shape of the rotor 130 depicts a truncated ellipsoid. The rotor's shape has a complex geometry so as to mate well to and form a seal with the simpler blade 140 geometry throughout its rotation. Other geometries may be incorporated to aid combustion and/or other utility, and to enable integration of seals.

Figure 10A:
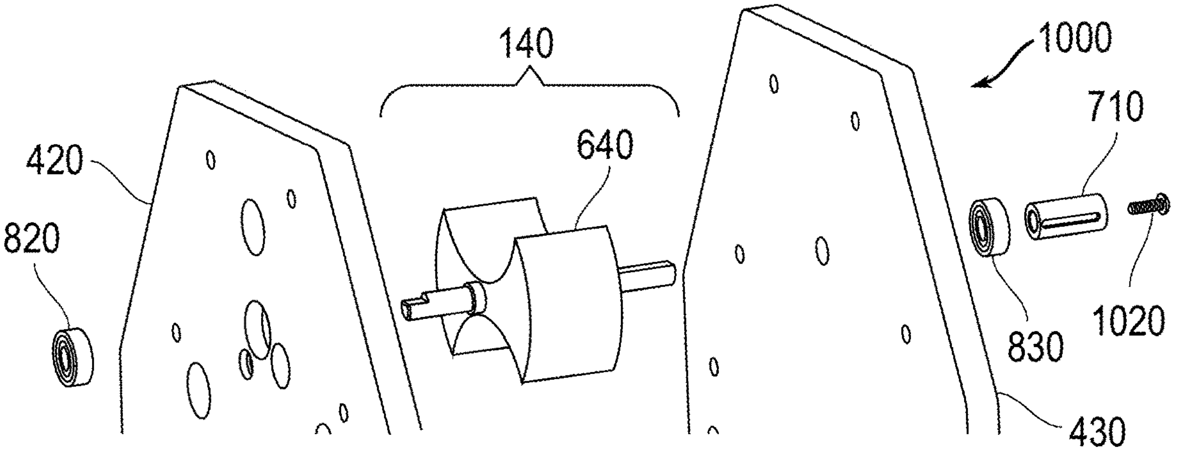
FIG. 10A is an isometric exploded view of the valve components in the engine.
Figure 10B:
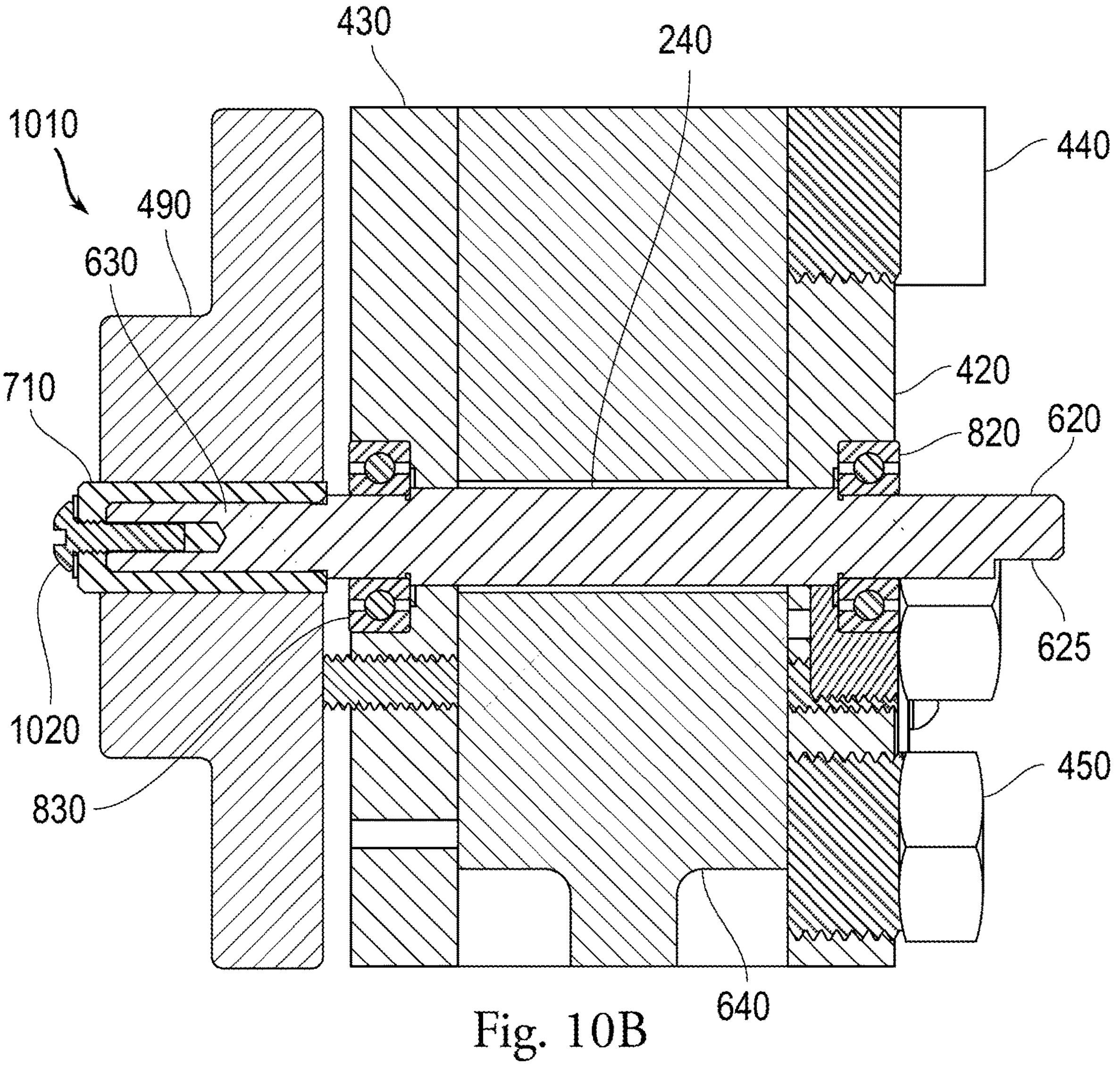
FIG. 10B is an elevation assembly view of the valve assembly.

FIG. 10A shows an isometric exploded view 1000 of an upper valve assembly, while FIG. 10B shows an elevation cross-section assembly view 1010. The front bearing 820 can insert into the front faceplate 420 through the stepped hole 530 and support the fore extension 620 of the blade shaft 240. The valve member 640 is disposed on the shaft 240. The rear bearing 830 can insert into the rear faceplate 430 through the stepped hole 560 and support the aft extension 630 of the blade shaft 240. A threaded bolt 1020 inserts into the bore 720 to secure the cylinder to the aft extension 630. The bearings 820 and 830 are depicted as ball bearings radially extending racers, although other designs could be considered.

Figures 11A, 11B, 11C, 11D:
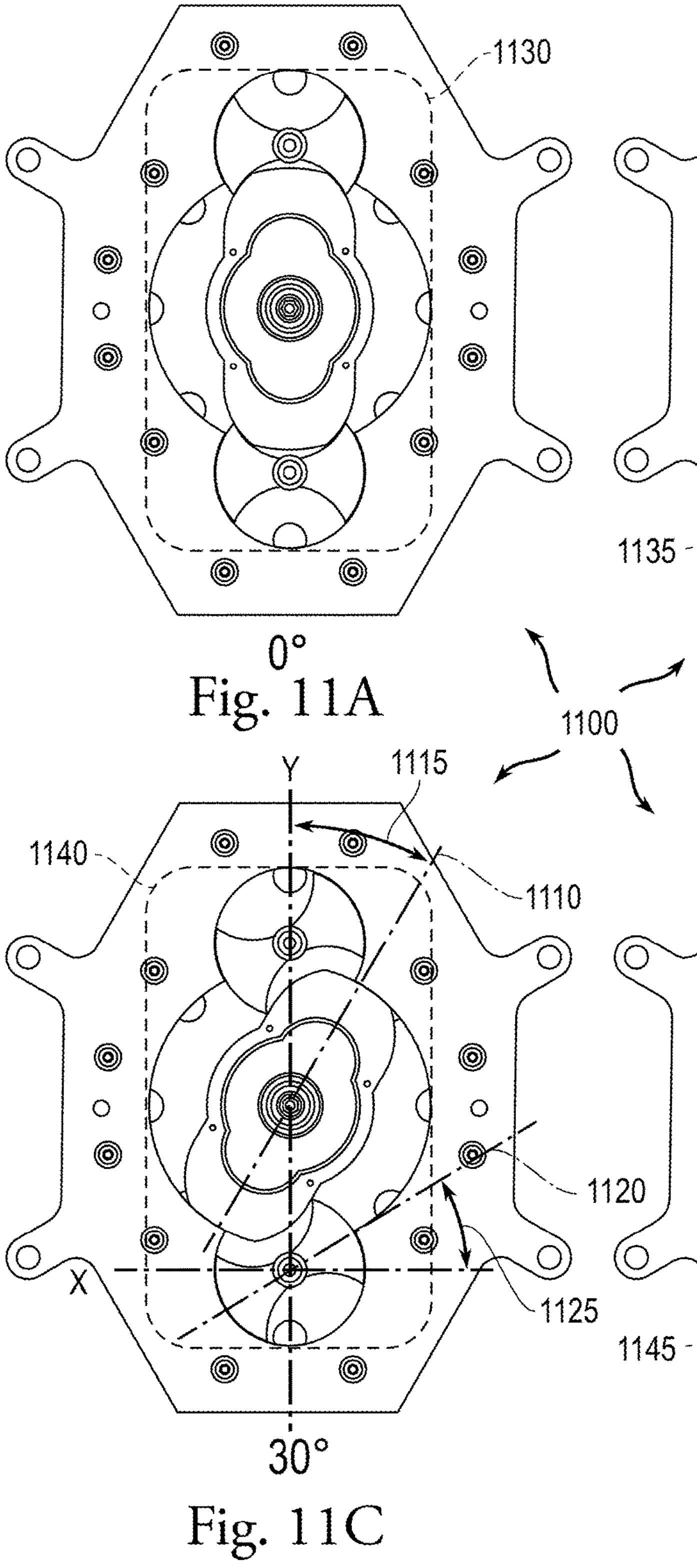
FIGS. 11A, 11B, 11C, 11D, 11E, 11F, 11G, 11H, 11I, 11J, 11K and 11L are elevation views of the housing with rotor and valves in EPIC cycle.

FIGS. 11A through 11L show elevation views 1100 of the housing 120 with the rotor 130 and blades 140 in EPIC cycle. The rotor 130 turns clockwise 250 to an angular position 1110 that defines an angle 1115 from the Y axis. Correspondingly, the blade 140 turns anti-clockwise to an angular position 1120 that defines an angle 1125 from the X axis. Because the housing 120 does not alter position or orientation in the engine 110, each rendition includes a dash window to incrementally illustrate the operation. FIG. 11A includes an initial window 1130 with the rotor at 0° position. FIG. 11B includes an initial window 1135 with the rotor at 15° position. FIG. 11C includes an initial window 1140 with the rotor at 30° position. FIG. 11D includes an initial window 1145 with the rotor at 45° position.

Figure 11E:
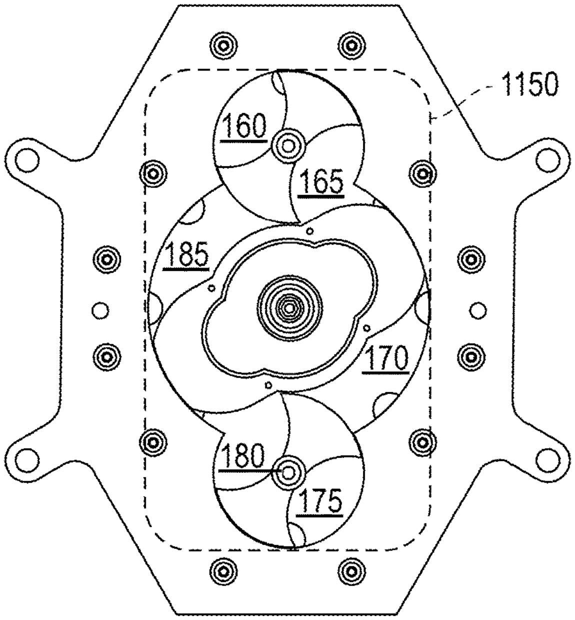
Figure 11F:
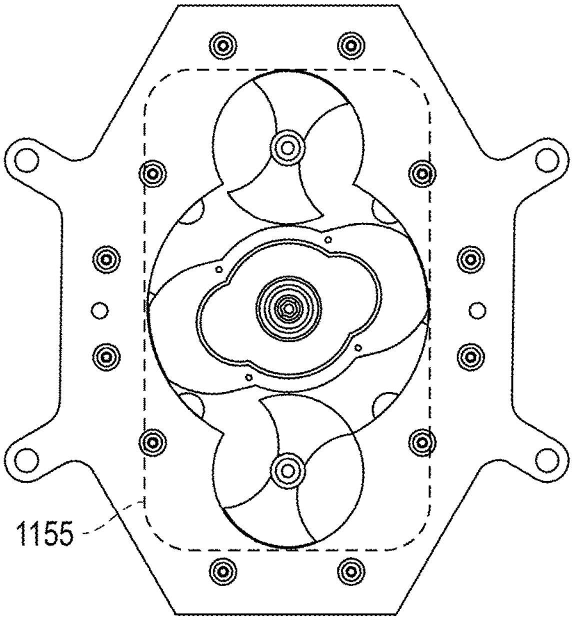
Figure 11G:
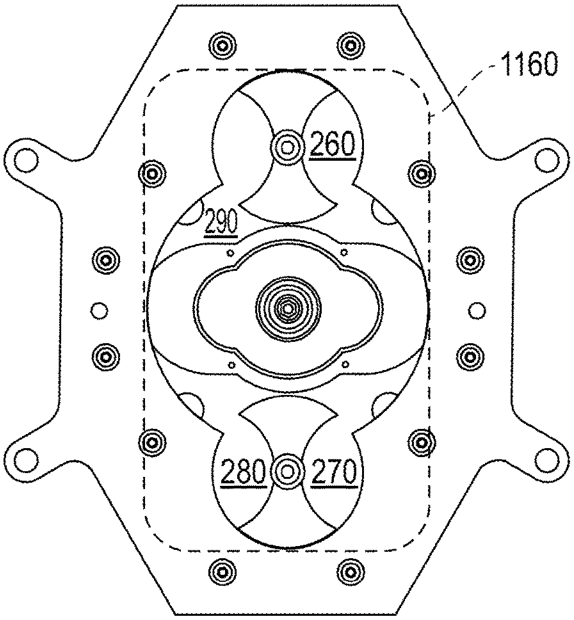
Figure 11H:
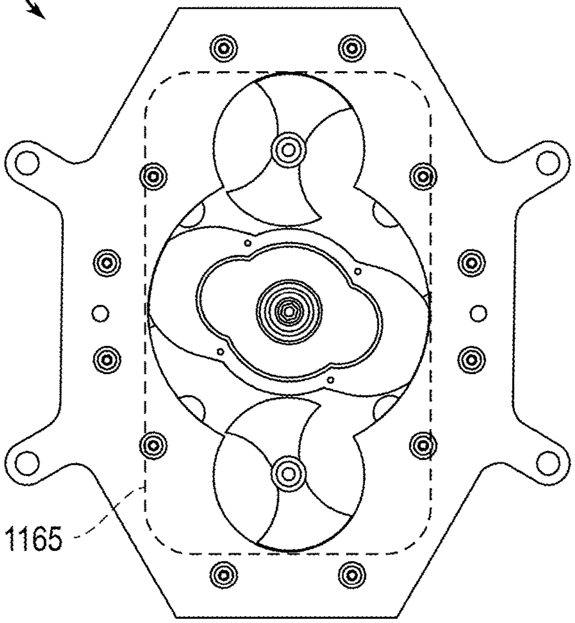
Figure 11I:
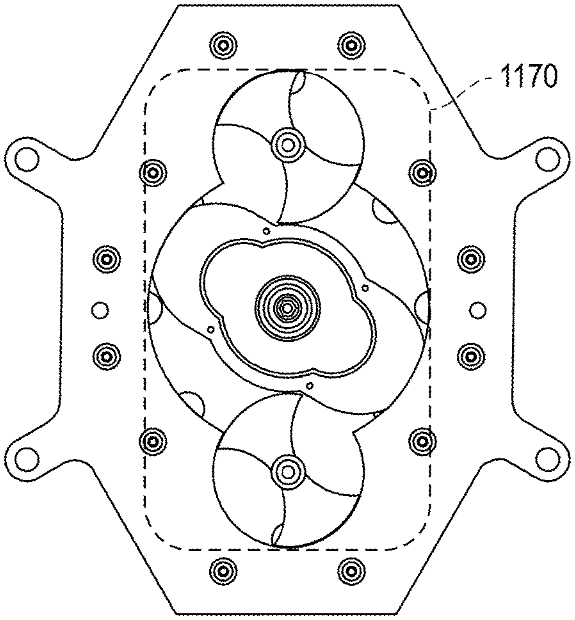
Figure 11J:
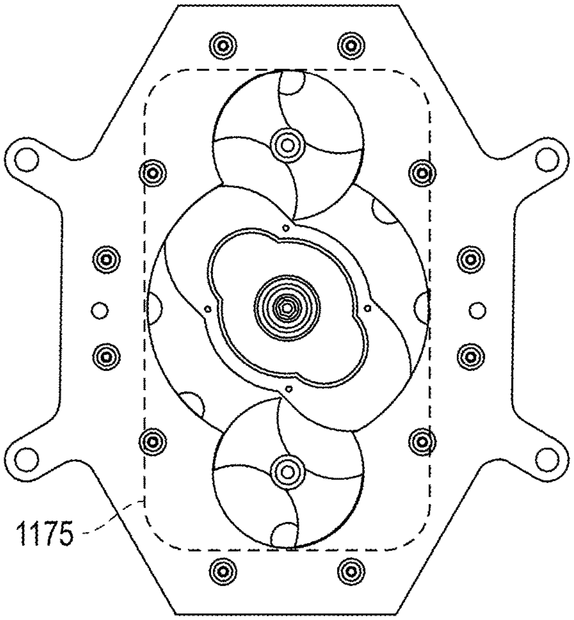
Figure 11K:
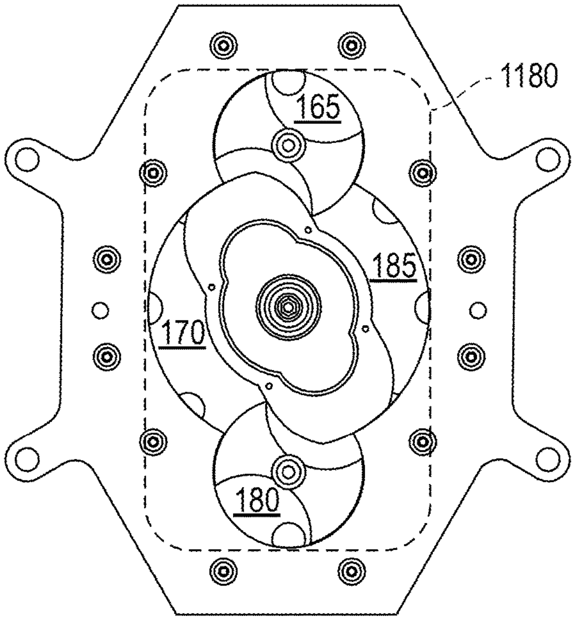
Figure 11L:
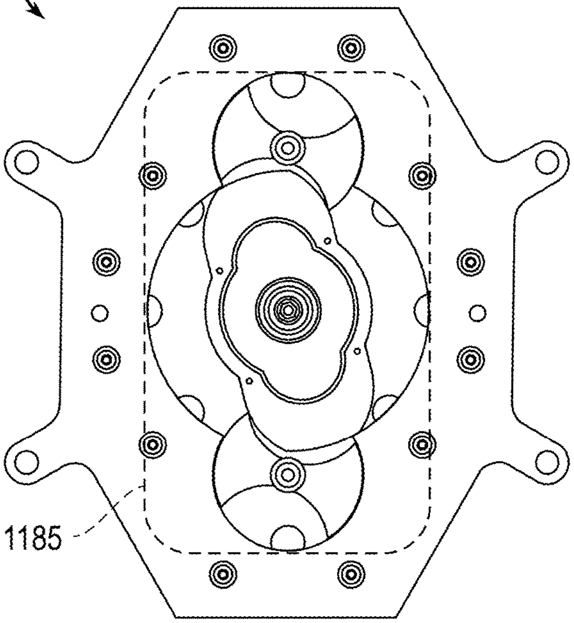

FIG. 11E includes an initial window 1150 with the rotor at 60° position. FIG. 11F includes an initial window 1155 with the rotor at 75° position. FIG. 11G includes an initial window 1160 with the rotor at 90° position. FIG. 11H includes an initial window 1165 with the rotor at 105° position. FIG. 11I includes an initial window 1170 with the rotor at 120° position. FIG. 11J includes an initial window 1175 with the rotor at 135° position. FIG. 11K includes an initial window 1180 with the rotor at 150° position. FIG. 11L includes an initial window 1185 with the rotor at 165° position. The EPIC cycle continues to the 180° position, which resembles the initial 0° position except inversion of the chambers.

By the 75° position 1155, the second and sixth chambers 165 and 185 mix to form the intake stroke 260, the third and fourth chambers 170 and 175 mix to form the compression stroke 270, the third and fifth chambers 170 and 180 mix to form the power stroke 280, and the first and sixth chambers 160 and 185 mix to form the exhaust stroke 290. These chambers separate again as the EPIC cycle continues as the rotor 130 and blades 140 turn. The changes in volume enable changes in pressure, while combustion additionally elevates temperature to enable gas expansion and thereby deliver torque to the shaft 230.

Exemplary embodiments also include a triple-valve configuration with symmetry at 120°. The following views illustrate engine geometry without explicitly featuring cover plates or associated components, which can be extrapolated based on views for the bilateral engine 110 and assembly 410. Other polygonal configurations, e.g., square, pentagon, hexagon, etc. can be envisioned without departing from the scope of the claims.

Figure 12:
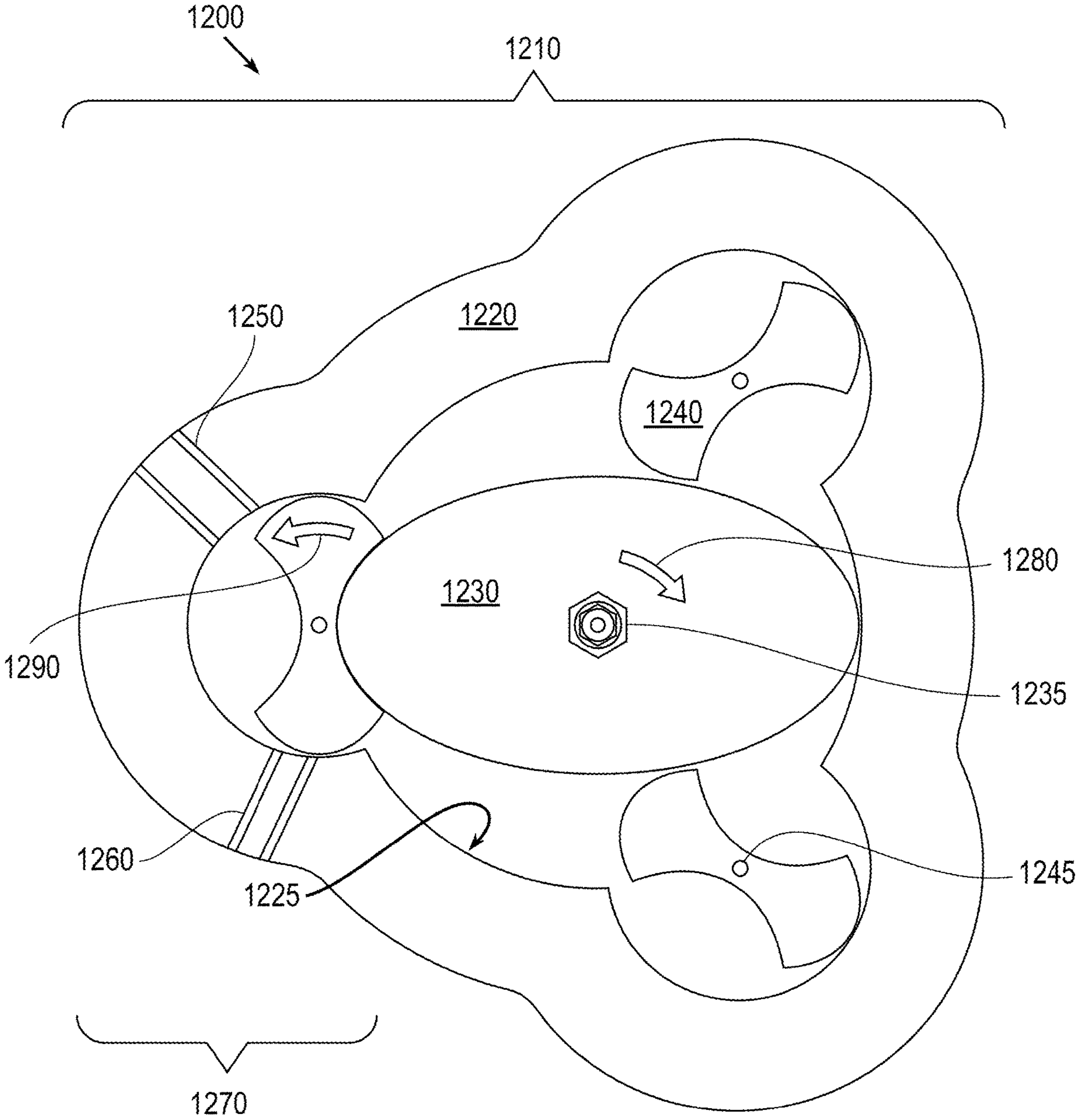
FIGS. 12 and 13 are elevation views of an alternate triple-valve engine.

FIG. 12 shows an elevation view 1200 of a triple-valve engine 1210 with a rounded triangular housing 1220 defines an interior contour 1225 that contains an elliptical rotor 1230 rotating about a central shaft 1235 and apple-core blades 1240 rotating about peripheral shafts 1245. The housing forms lobes, one of which connects the interior contour 1225 with external conditions by an intake port 1250 and an exhaust port 1260. The housing 1220 forms three lobes 1270 in which to contain the blades 1240. The rotor 1230 turns clockwise 1280, while the blades 1240 turn anti-clockwise 1290.

Figure 13:
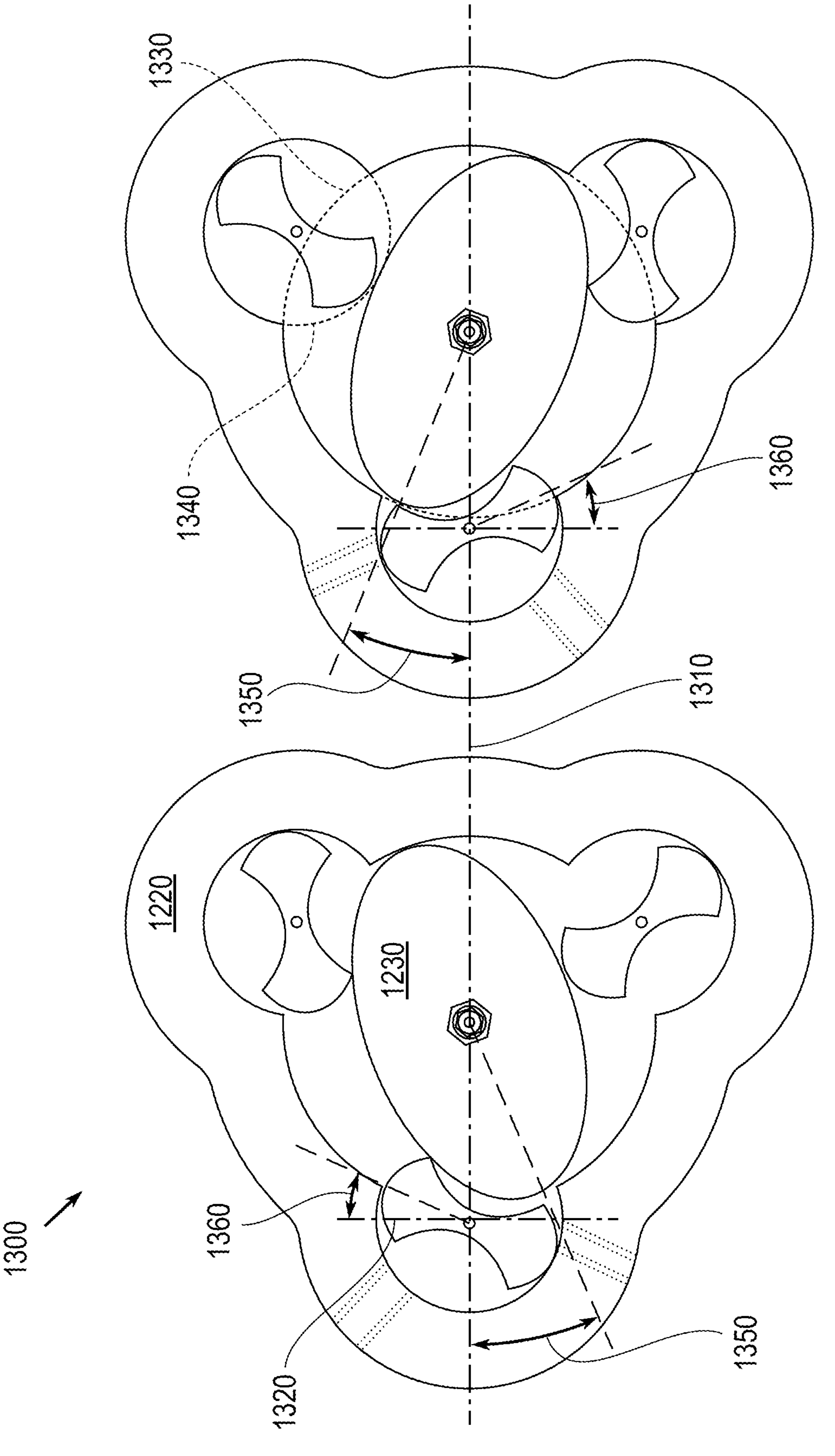

FIG. 13 shows elevation views 1300 of the triple-valve engine 1210. illustrating angular details of the rotor 1230 and triple blades 1240. Each blade 1240 corresponds to an axis of symmetry 1310 for the housing 1220, and has a peripheral axis 1320 for rotational orientation orthogonal to the symmetry axis 1310. The contour 1225 forms concentric cutout circles as space: center circle 1330 for the rotor 1230 to rotate, and three intersecting peripheral circles 1340 for the blades 1240 to respectively spin. The rotor 1230 turns about its major axis along its shaft 1235 from the housing symmetry axis 1310 by a rotor angle 1350. Similarly, the blade 1240 turns from its peripheral axis 1320 by blade angle 1360. Although embodiments described herein include the bilateral two-valve configuration 110 and the trinary three-valve configuration 1210, other polygonal symmetrical arrangements can be contemplated without departing from the scope of the claims.

Figure 14B:
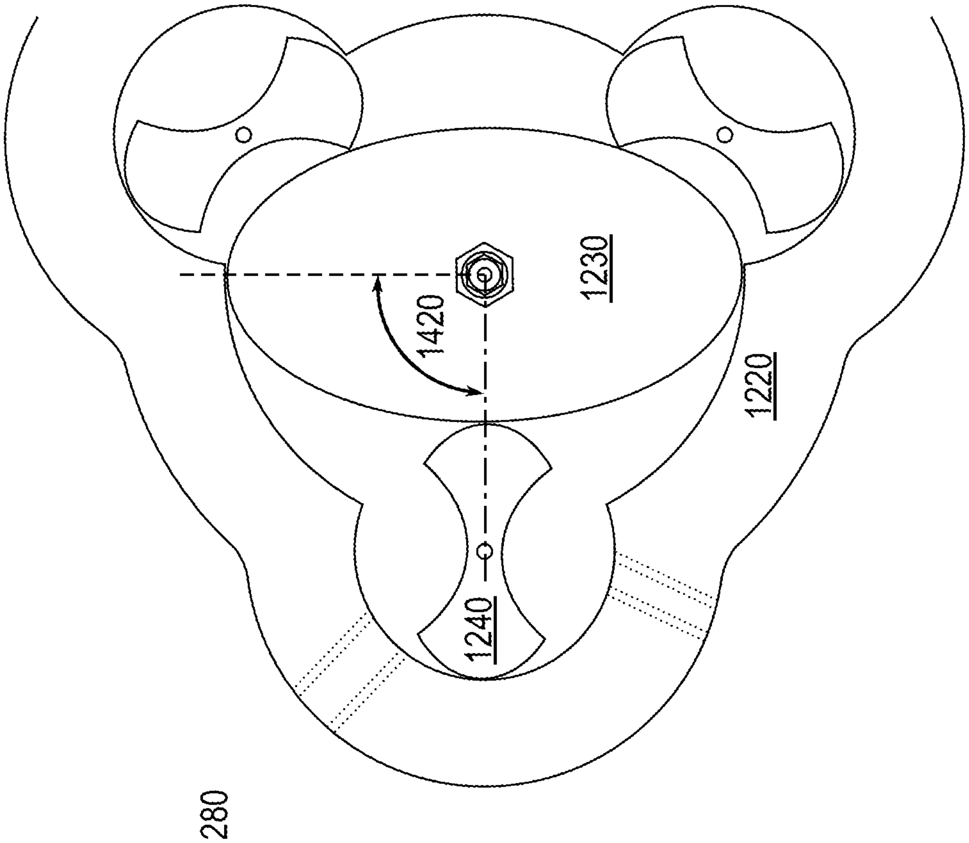
FIGS. 14A, 14B, 14C, 14D, 14E, 14F, 14G and 14H are elevation detail views of the triple-valve engine.
Figure 14A:
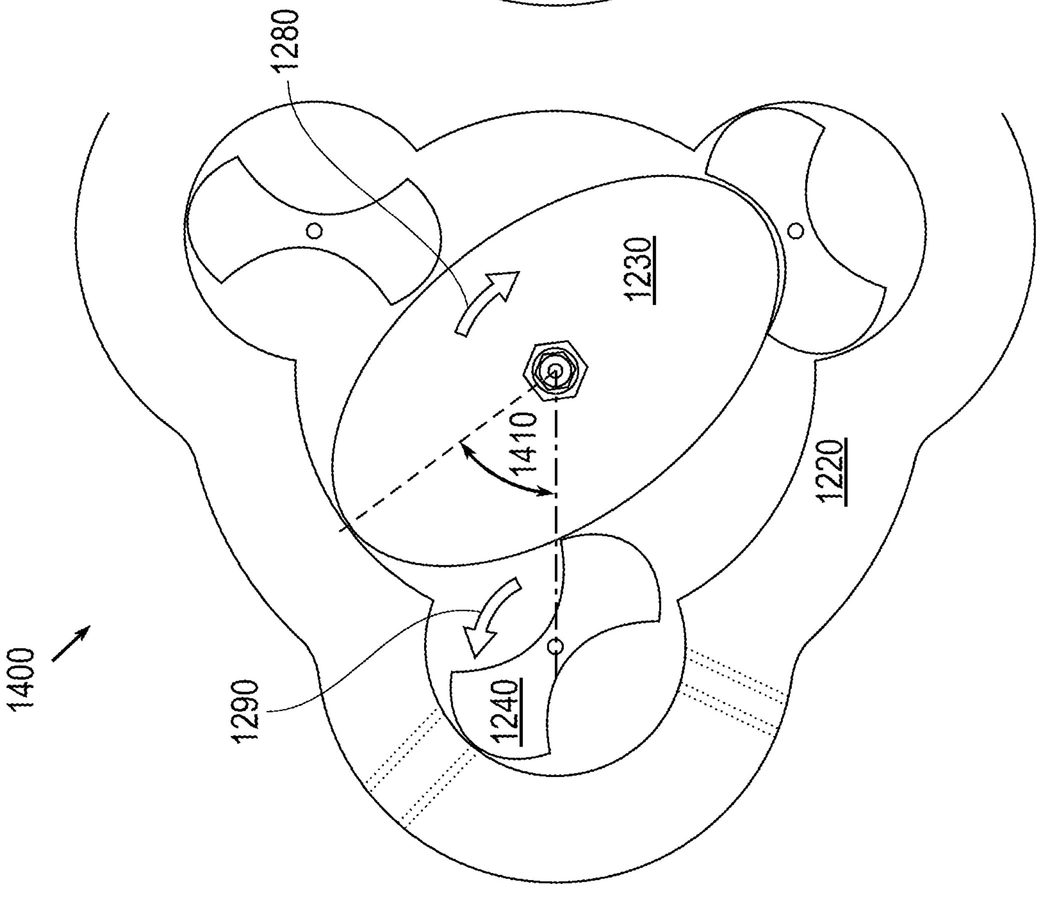
Figure 14C:
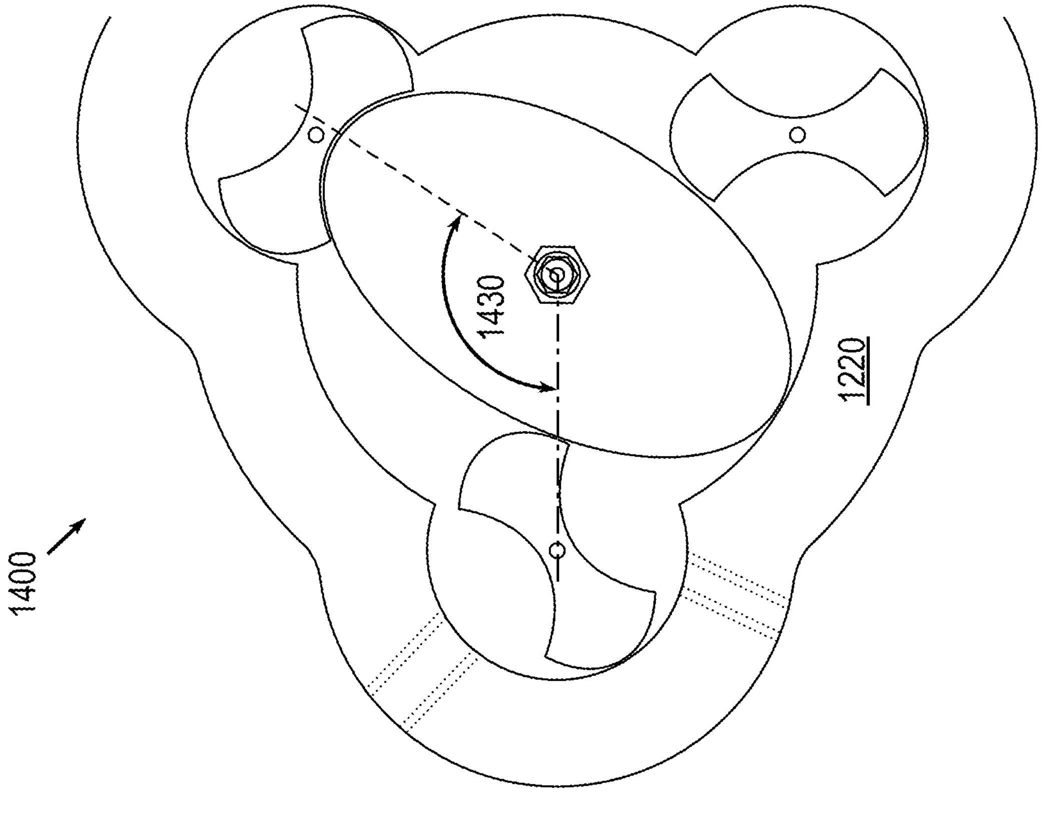
Figure 14D:
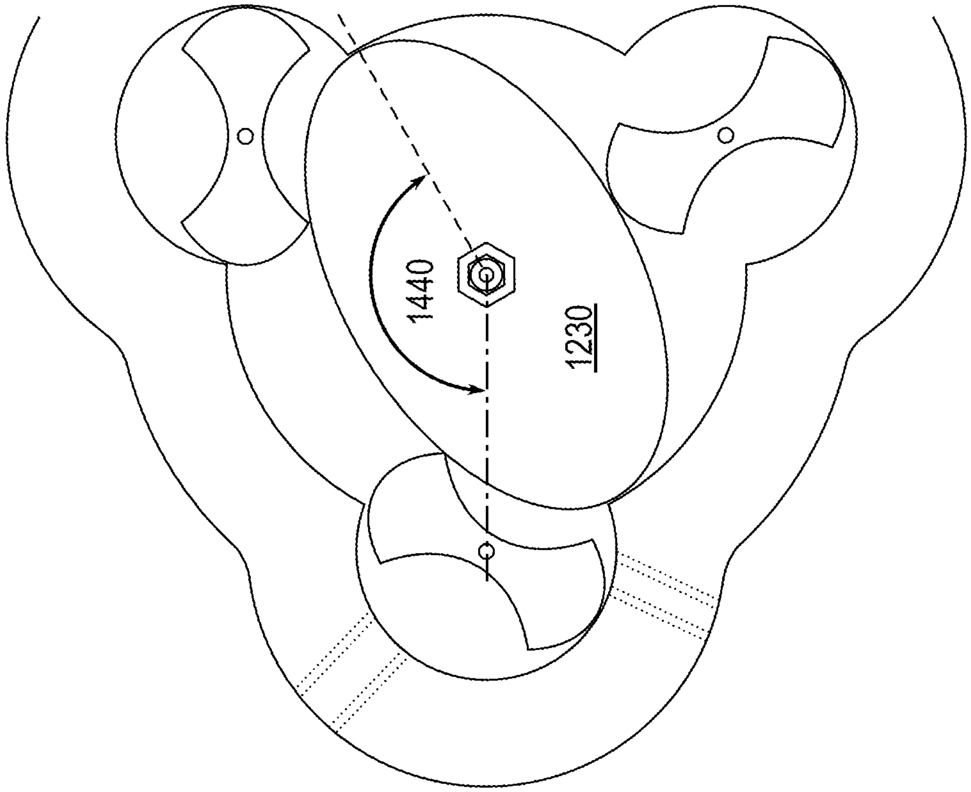
Figure 14F:
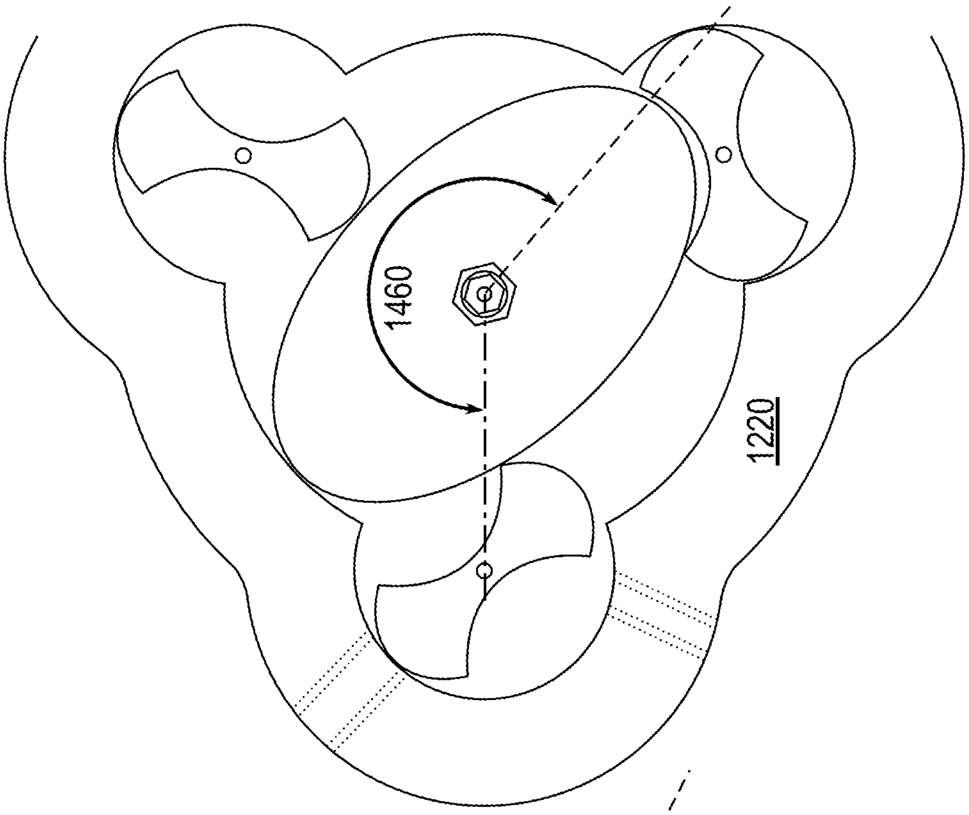
Figure 14E:
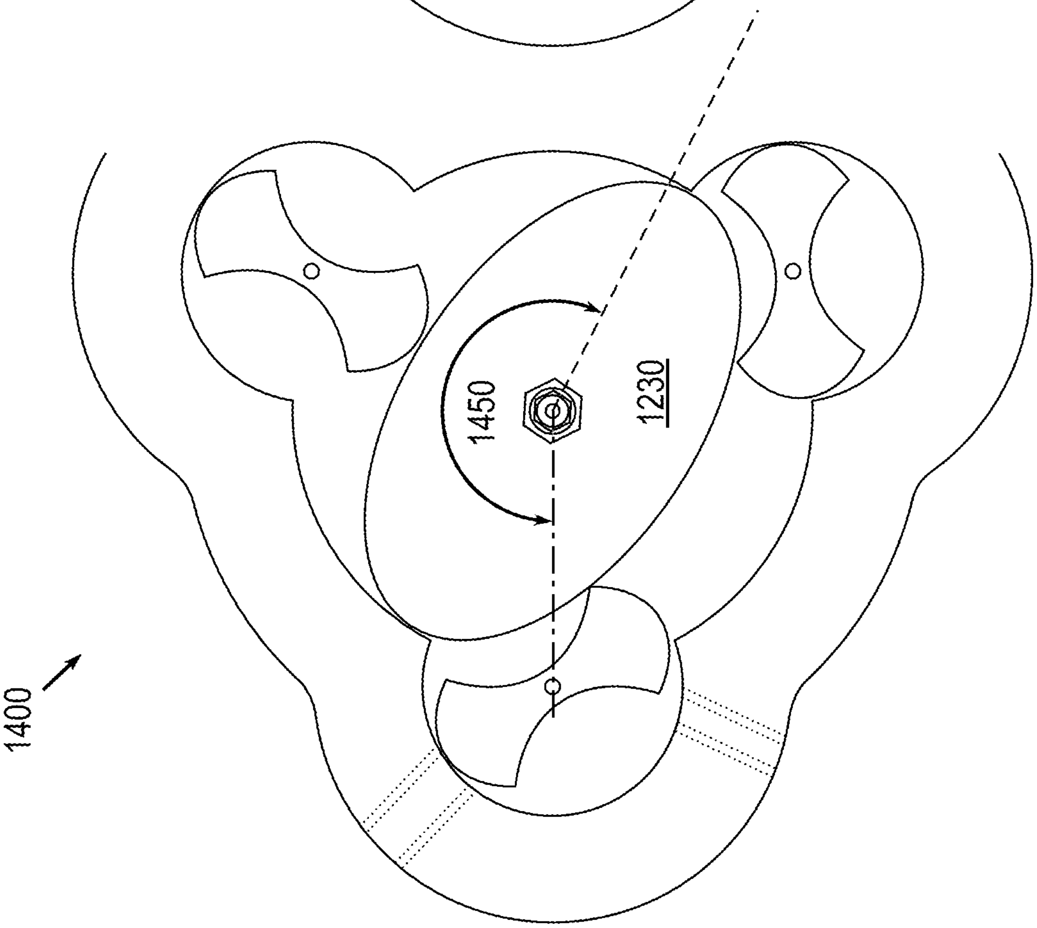
Figure 14H:
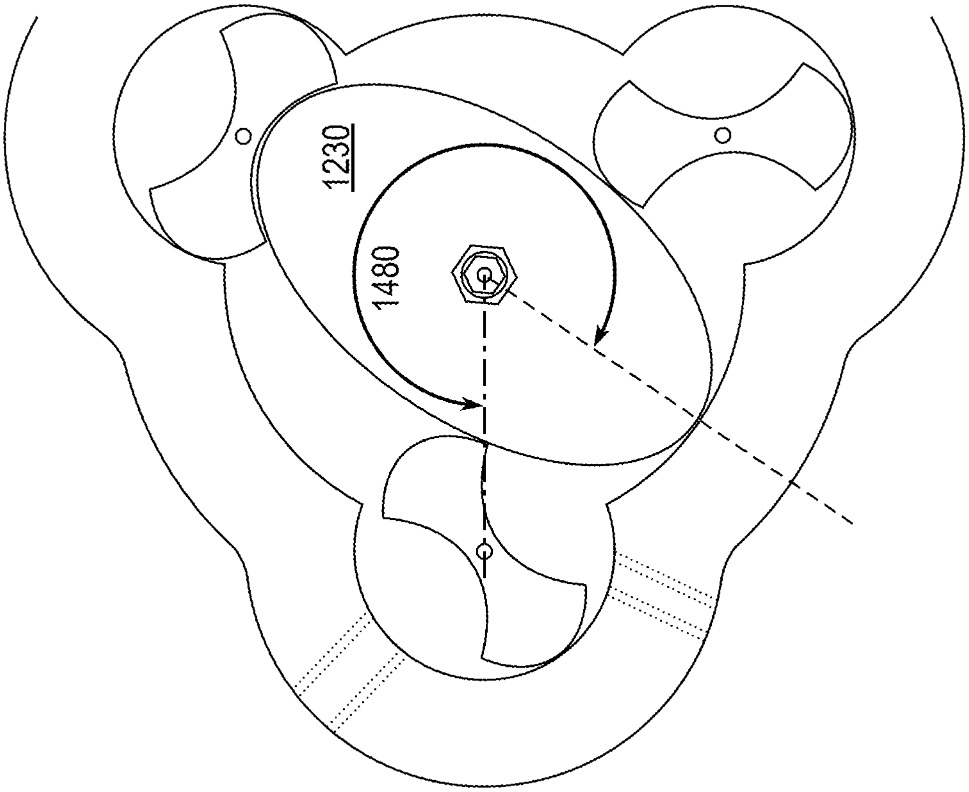
Figure 14G:
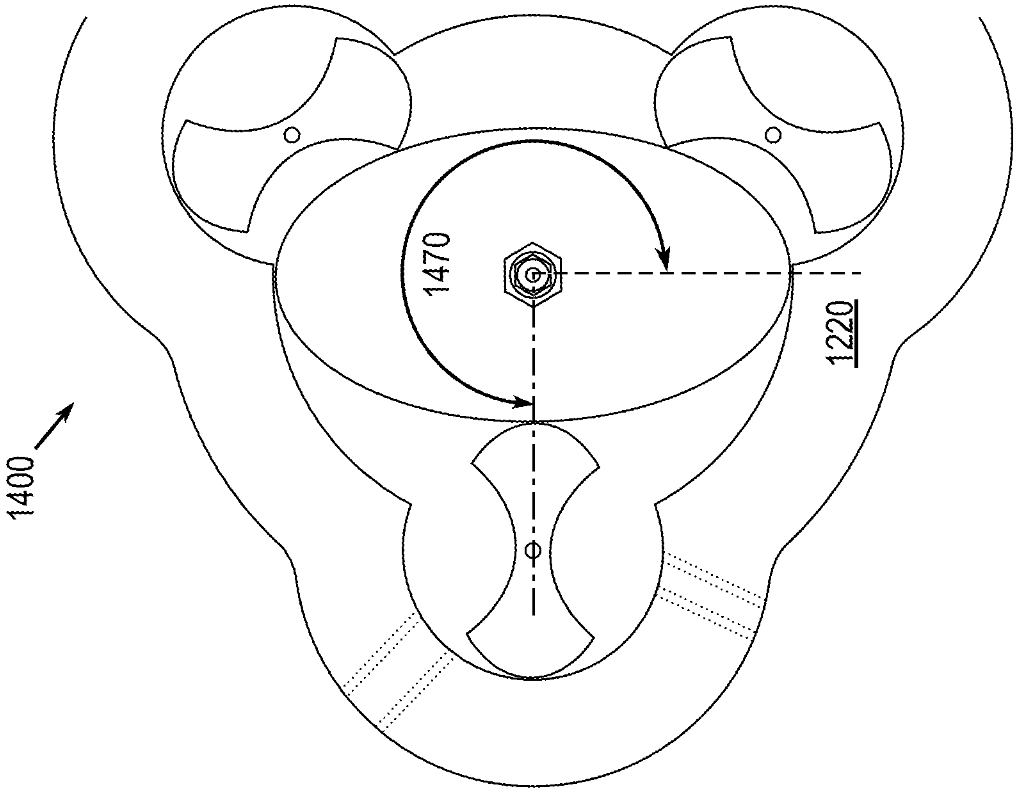

FIGS. 14A-14H show elevation detail views 1400 of the relative rotations of the rotor 1230 and blades 1240 from the left lobe 1270 while they rotate. In FIG. 14A, the rotor 1240 has turned 45° as rotation angle 1410 from the symmetry axis 1310 in relation to orientation angle 1350. As the EPIC cycle progresses in FIG. 14B, the rotor 1240 has turned 90° as angle 1420. Similarly in FIG. 14C, the rotor 1240 has turned 120° as angle 1430. In FIG. 14D, the rotor 1240 has turned 150° as angle 1440; in FIG. 14E, the rotor 1240 has turned 210° as angle 1450; in FIG. 14F, the rotor 1240 has turned 225° as angle 1460; In FIG. 14G, the rotor 1240 has turned 270° as angle 1470; and finally in FIG. 14H, the rotor 1240 has turned 315° as angle 1480. Strokes for the EPIC cycle for the triple-valve engine 1210 are fundamentally similar to those described for the bilateral engine 110.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A bilateral rotary combustion engine for providing torque, said engine comprising:

a planar housing having a circular center cavity, and first and second circular lateral cavities overlapping said center cavity and disposed along a longitudinal axis;

a truncated ellipsoid rotor that turns on a rotor shaft along a rotation axis perpendicular to said longitudinal axis, said rotor being disposed within said center cavity;

a pair of double-concave blades that flank said rotor disposed within their corresponding lateral cavity and turn on corresponding blade shafts parallel to said rotor shaft;

fore and aft cover plates that flank said housing along said rotation axis to cover said center and lateral cavities; and a gear box disposed on said aft cover plate and having a rotor gear wheel and adjacent corresponding blade gear wheels, said rotor gear wheel turning with said rotor shaft while engaging both blade gear wheels along their peripheries, said blade gear wheels turning with said corresponding blade shafts, wherein said blades turn opposite to said rotor, and a first portion of said first lateral cavity periodically joining a second portion of said center cavity to provide first intake, first compression, first power and first exhaust strokes, while a third portion of said second lateral cavity periodically joining a fourth portion of said center cavity to provide second power, second exhaust, second intake and second compression strokes as said rotor and said blades turn.

2. The engine according to claim 1, wherein said housing includes inlet and exhaust ports into at least one of said lateral cavities at opposite sides of said longitudinal axis.

3. A polygonal rotary combustion engine for providing torque, said engine comprising:

a planar housing having a circular center cavity, and a plurality of circular lateral cavities overlapping said circular center cavity and disposed circumferentially therealong, each circular lateral cavity and said circular center cavity having centers that form a rotational plane;

a truncated ellipsoid rotor that turns on a rotor shaft perpendicular to said rotational plane;

a plurality of double-concave blades that radially flank said cycloid oval rotor, each blade disposed within a respective circular lateral cavity of said plurality of lateral cavities and turning on a corresponding blade shaft parallel to said rotor shaft;

fore and aft cover plates that axially flank said housing along said rotor shaft to cover said circular center and lateral cavities; and a gear box disposed on said aft cover plate and having a rotor gear wheel and adjacent blade gear wheels, said rotor gear wheel turning on said rotor shaft while engaging said blade gear wheels along their peripheries, each blade gear wheel turning on said corresponding blade shaft, wherein said double-concave blades turn opposite to said cycloid oval rotor, and a first portion of a first lateral cavity periodically joins a second portion of said center cavity to provide a first sequence of strokes of intake, compression, power and exhaust, while a third portion of a second lateral cavity periodically joins a fourth portion of said center cavity to provide a second sequence of strokes distinguishable from said first sequence.

* * * * *